United States Patent [19]

Szeverenyi

[11] 3,859,645

[45] Jan. 7, 1975

[54] TEMPERATURE COMPENSATED FLUID LEVEL SENSOR

[75] Inventor: Nikolaus A. Szeverenyi, Warren, Pa.

[73] Assignee: GTE Sylvania Incorporated, Stamford, Conn.

[22] Filed: June 4, 1973

[21] Appl. No.: 366,348

[52] U.S. Cl. ............................ 340/244 R, 337/324
[51] Int. Cl. ........................................ G08b 23/00
[58] Field of Search..... 340/244 R, 244 C; 337/324, 337/326

[56] References Cited
UNITED STATES PATENTS

| | | | |
|---|---|---|---|
| 2,755,361 | 7/1956 | Hertan | 337/324 |
| 3,329,787 | 7/1967 | Novas | 337/324 |
| 3,432,840 | 3/1969 | Neapolitakas | 340/244 R |

Primary Examiner—Thomas B. Habecker
Attorney, Agent, or Firm—Norman J. O'Malley; Donald R. Castle; Lawrence R. Fraley

[57] ABSTRACT

There is described a sensing device for detecting the presence or absence of fluid. The device comprises a housing member defining a first chamber, a thermally conductive member within said first chamber, a tip member secured to said housing and forming a closure for said first chamber, an element positioned substantially within said first chamber and having a second chamber enclosed therein, said element having first and second spaced apart portions, said first portion being joined in heat conductive relationship to said thermally conductive member and said second portion being secured in thermally conductive relationship to a surface of the tip member within said first chamber, means for heating said element including said second chamber and said first and second spaced apart portions, movable contact means positioned within said second chamber, said movable contact means adapted for engaging a pair of connecting means positioned within said element only when the temperature difference between said first and second portions of said element exceeds a predetermined level, and heat responsive means for moving said movable contact means within said second chamber.

15 Claims, 5 Drawing Figures

Patented Jan. 7, 1975

3,859,645

3,859,645

TEMPERATURE COMPENSATED FLUID LEVEL SENSOR

CROSS REFERENCE TO CO-PENDING APPLICATION

This application contains matter disclosed in a related application U.S. Ser. No. 236,148 and assigned to the assignee of the present invention. This related application is now U.S. Pat. 3,772,673 and titled "Temperature Compensated Fluid Level Sensor."

BACKGROUND OF THE INVENTION

The present invention relates to fluid sensing devices and more particularly to a device for providing an indication when the fluid within a container attains a predetermined level. Even more particularly, the present invention relates to a device which can accomplish the above described function and still compensate for temperature variations in the fluid being detected.

Methods known in the prior art for detecting the level of fluid within a container have varied from mechanically operated floats to probing devices requiring extensive electronic circuitry. One shortcoming of many of these devices has been the inability to compensate for temperature changes in the fluid being measured. Those which could do so most usually required added circuitry of similar components which in turn added appreciably to the complexity of operation of the device as well as the cost of manufacture.

It is believed, therefore, that a device for detecting the presence or absence of fluid at a predetermined level within a container which would compensate for varying temperatures of the fluid being measured as well as be relatively simple in operation and inexpensive to manufacture would constitute an advancement in the art.

OBJECTS AND SUMMARY OF THE INVENTION

It is therefore a primary object of this invention to provide a fluid level sensing apparatus which includes a means for compensating for possible varying temperatures of the fluid to be detected.

It is a further object of this invention to provide a sensing apparatus which operates in a relatively simple manner and is relatively inexpensive to manufacture.

In accordance with one aspect of the present invention, there is provided a device for detecting the presence or absence of fluid at a predetermined level within a container. This device comprises a housing member which defines a first chamber, a thermally conductive member positioned within this first chamber, a tip member secured to the housing to form a closure for the first chamber, an element within the chamber having a second chamber enclosed therein and a pair of spaced apart portions. The first of these spaced apart portions is secured in thermally conductive relationship to said thermally conductive member while the second is joined in a thermally conductive relationship to a surface of the tip member within the first chamber. A movable contact means is provided within the second chamber and adapted for engaging a pair of connecting means positioned within the element only when the temperature difference between both portions exceeds a preestablished level. A means for heating the element is also provided as well as a heat responsive means for moving the contact means within the second chamber.

An apparatus is also disclosed which utilizes the above described device and incorporates a means for sensing when the movable contact engages said connecting means.

BRIEF DESCRIPTION OF THE DRAWINGS

FIG. 5 is a block diagram of a circuit employing a latching means.

DETAILED DESCRIPTION OF THE PREFERRED EMBODIMENTS

For a better understanding of the present invention, together with other and further objects, advantages and capabilities thereof, reference is made to the following disclosure and appended claims in connection with above described drawings.

Figure 1:
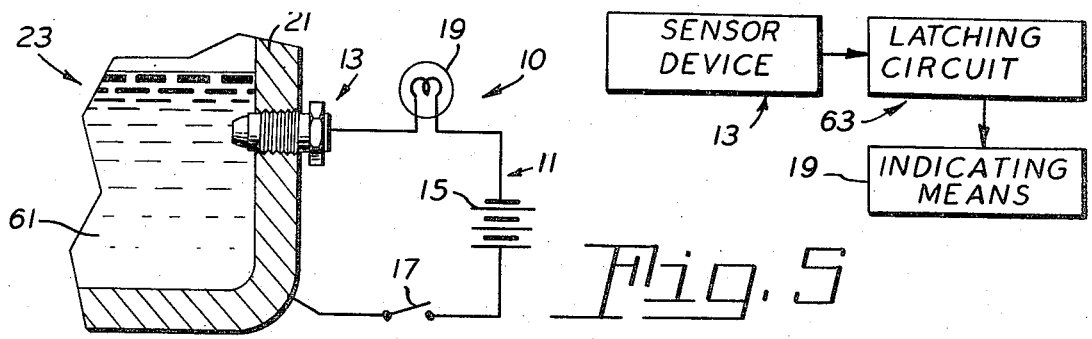
FIG. 1 is a side elevational view of one embodiment of the present invention.

In FIG. 1 one embodiment of a fluid level detecting apparatus 10 in accordance with the invention is illustrated and shown to comprise an electrical circuit 11 and a sensor device 13. Circuit 11 comprises a potential source illustrated as battery 15, a switching means 17 for opening and closing circuit 11, and a current indicating means, illustrated as bulb 19. Sensor device 13 is electrically connected to circuit 11 and is shown to be positioned within wall 21 of a fluid holding container 23. Although the particular method illustrated for positioning sensor 13 is to place it in the side of container 23, sensor 13 may be placed in either the bottom or top of the container depending on the level of fluid desired or the configuration of the container. Furthermore, although the method shown for retaining sensor 13 in wall 21 is by screw threads (the sensor being provided with external screw threads to mate with corresponding threads in wall 21), other methods for retention are possible, an example being either welding or soldering. The method illustrated is preferred, however, because it provides relative ease of removal of sensor 13 in the event of damage to the sensor or container.

Figure 2:
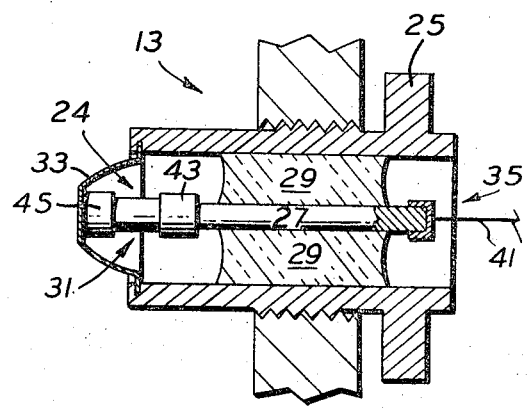
FIG. 2 is an enlarged view of the sensor of FIG. 1.

In FIG. 2 can be seen a more detailed view of sensor 13, which is shown to comprise a housing 25 of electrically conductive material, an electrical and thermal conductive member, illustrated as center post 27, which is positioned within a first chamber 24 within housing 25 and electrically insulated from housing 25 by insulating material 29, an element 31, and a tip member 33 of electrically conductive material. Center post 27 is electrically joined to circuit 11 via plug 35 which in turn is connected to conducting wire 41. Plug 35 is but one means possible for providing this interconnection and is not meant as the sole method to which the invention is limited. Additional connecting means, including an alligator clip or even a single wire soldered to post 27 are possible. In the event that the atmosphere surrounding container 23 is not favorable for exposed electrical connections, a plug having an insulating cap to encompass the external portions of either post 27 or housing 25 is preferred.

Tip member 33, sealed in housing 25 to thereby encapsulate element 31 therein, is adapted for being subjected to the fluid within container 23. A preferred material for tip member 33 is sold under the trade name "Rodar" and manufactured by the W. B. Driver Comp. of Newark, N.J., a subsidiary of the assignee of the present invention. "Rodar," consisting essentially of about 29 percent by weight nickel, 17 percent by weight cobalt, and the remainder iron, is a suitable electrical conductor and possesses the additional property of relatively low thermal conductivity. This additional property, as will be further explained, is highly desirable to enhance the functioning characteristics of sensor 13. Element 31, comprising first and second spaced apart portions 43 and 45 respectively, is joined at first portion 43 to center post 27 and at second portion 45 to tip member 33. First and second spaced apart portions 43 and 45 are of electrically conductive material. The material preferred for these members is a nickel-silver metallic alloy, although any of the well known metals or metal alloys having good electrical conducting properties can be utilized. Electrical connection between circuit 11 and housing 25 may be accomplished simply by affixing a wire from circuit 11 to any external portion of the housing, using any of the conventional methods, for example, welding. In the event that container 23 is of metallic nature as indicated or any material having good electrical conducting properties, circuit 11 may be connected thereto at any suitable location.

Figure 3:
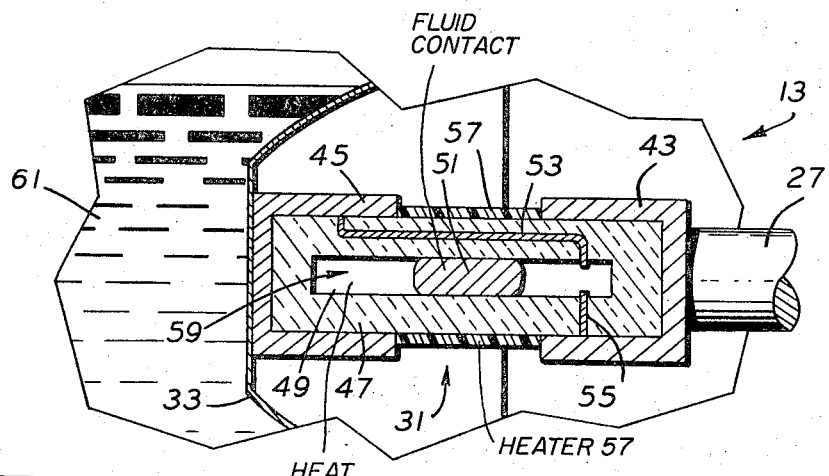
FIGS. 3 and 4 are enlarged views of the sensor device of FIG. 1 during various phases of operation.
Figure 4:
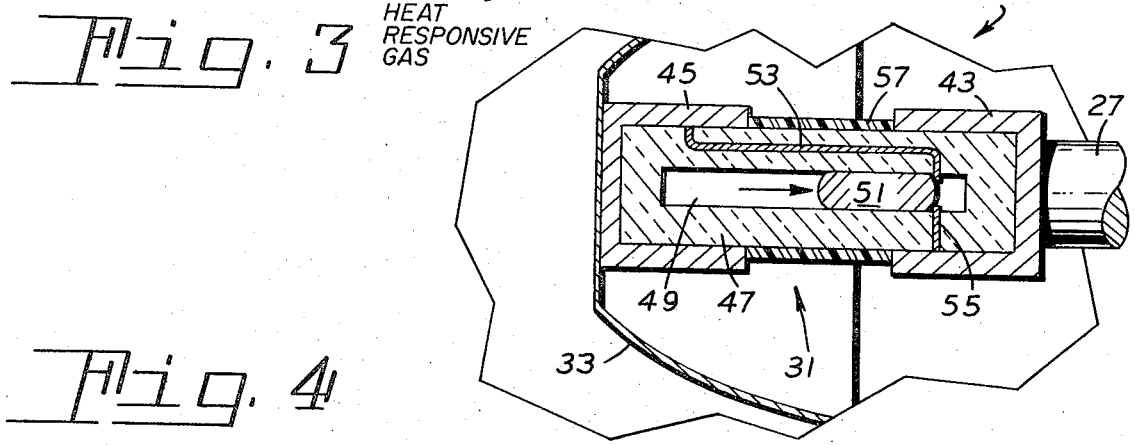

A more detailed view of element 31 can be seen in FIGS. 3 and 4 wherein element 31, in addition to spaced apart portions 43 and 45, is shown to comprise a substantially centrally located body portion 47 having a second chamber 49 enclosed therein. Located within second chamber 49 is a movable contact means, illustrated as member 51 which is adapted for moving within chamber 49 as the operating conditions affecting the device alter. Body portion 47 is comprised of glass or similar electrically insulative material while contact member 51 is preferably of mercury.

Electrically connected to second spaced apart portion 45 is a first connecting means, illustrated as lead 53 which is positioned within body portion 47 in such a manner so as to have access to that portion of second chamber 49 nearest first spaced portion 43. A second connecting means, illustrated as lead 55 has access to second chamber 49 in the manner shown and is positioned within body 47 to be electrically joined to first spaced apart portion 43.

A means for heating element 31 is provided and comprises a layer of resistive material 57 positioned about body portion 47 and interconnecting both spaced apart portions 43 and 45. A preferred resistive material is tin oxide comprising a layer approximately 1-2 mils thick. Resistive material 57 provides a means for heating element 31 when electrical current is passed therethrough.

A heat responsive means 59 is also provided for device 13 and is adapted for moving movable contact member 51 within second chamber 49. In the preferred embodiment, means 59 comprises a heat responsive fluid medium, preferably the inert gas nitrogen, which is positioned in both ends of chamber 49 on each side of contact member 51. Other heat responsive inert gaseous media having relatively low molecular weights and high degrees of expansivity are acceptable for means 59 and include helium, carbon dioxide, and neon. However, the present invention is not restricted to gaseous or similar fluid media to accomplish the described motion. A temperature responsive solid article such as a bimetal could also successfully be utilized, said bimetal being affixed at one end in body 47 nearest portion 45 and having a free end within second chamber 49 adapted for engaging and thereafter moving contact 51 when the temperature about the bimetal reaches a pre-established level. Still another configuration including both a heat responsive fluid medium and a mechanically operated article could be utilized. For example, a metallic spring member positioned within the end of chamber 49 nearest portion 43 could have one end affixed within body 47 and engaged at the other end to contact 51. This spring could serve to return contact 51 to its original position after an inert fluid medium of the nature described and positioned within the end of chamber 49 nearest portion 45 has cooled sufficiently and thereby contracted. The described spring would of course be positioned in a non-engaging relationship with the exposed ends of leads 53 and 55.

To explain the operation of apparatus 10, as shown in FIG. 1, particular reference is also made to items illustrated in detail in FIGS. 3 and 4. In FIG. 3, tip member 33 is shown as being subjected to fluid 61 within container 23.

To operate apparatus 10, switching means 17 is closed, thereby providing electrical current to circuit 11 and to sensor 13. A typical direction of current flow from battery 15 is through bulb 19, center post 27, first opposing end 43 of element 31, resistive material 57 of element 31, shown in FIG. 3, second opposing end 45 of element 31, tip member 33, housing 25 and thereafter back to circuit 11. Because this current must pass through resistive material 57, it is not sufficient to activate bulb 19. Assuring that bulb 19 will not light under these conditions is easily accomplished by proper selection of corresponding elements in the sensor and circuit. One example of a workable circuit-sensor arrangement is to use a 12 volt battery connected to a bulb having a resistance of approximately 1 ohm. When using this combination, the desired resistance of the resistive material of element 31 is approximately 240 ohms. The resistance of other elements in sensor 13, particularly housing 25, opposing portions 43 and 45, center post 27, tip member 33, and leads 53 and 55 is minimal and can be considered effectively as zero.

The current through resistive material 57 causes this material to become warm as is the case in almost all electrical resistors. This heat then dissipates out through opposing portions 43 and 45 of element 31. the heat dissipated through portion 43 is heat sinked further through center post 27, insulative material 29, housing 25, and eventually into container 23. Provided tip member 33 remains subjected to fluid 61, the heat created in element 31 is dissipated at a substantially equal rate through the above-described channels thereby maintaining the temperature of all members within sensor 13 approximately the same. However, when the fluid level drops below tip member 33, as illustrated in FIG. 4, an imbalance to this rate of dissipation is created. This unequal rate occurs primarily because the fluid, which previously served as a heat sink for the heat generated in portion 45, is now absent. However to further assure this imbalance during a low fluid level, it is preferred that the overall volume of center post 27 be substantially greater than the corresponding volume of tip member 33. It is also additionally preferred that the coefficient of thermal conductivity of center post 27 be larger than that of tip member 33, but this is not necessarily required provided a substantial difference of volumes between these two members exists. In the particular embodiment, the tip member comprised of Rodar has a coefficient of thermal conductivity of approximately 12.0 BTU/(hr.) (sq. ft.) (°F per ft.) while that of center post 27 which is preferably of steel or similar composition, ranges between 25 and 40 BTU/(hr.) (sq. ft.) (°F per ft.).

As described, the absence of fluid 61 now causes portion 45 to become substantially warmer than portion 43. When this temperature difference attains a predetermined level, the inert gas located within second chamber 49 and nearest portion 45 will expand, forcing movable contact member 51 in the direction indicated. When contact member 51 engages the exposed ends of leads 53 and 55 within second chamber 49 (as shown in FIG. 4), electrical current from center post 27 through first opposing end 43 is permitted to by-pass resistive material 57 and pass directly to second spaced apart portion 45 via the newly formed circuit path because the combined resistance of leads 53 and 55 is effectively zero, as previously described. The current through bulb 19 is now at a sufficient level to actuate the bulb which in turn indicates to an operator that the fluid level of container 23 is below tip member 33. As can be appreciated, various modifications to device 13 can be made without departing from the scope of operation of the device. For example, movable contact 51 could engage a formed portion of portion 43 which could be positioned within body 47 in much the same manner as lead 55. This would eliminate the need for lead 55 as well as provide a more direct means of engagement between contact 51 and portion 43. A similar alteration could be performed with spaced apart portion 45, thus eliminating lead 53.

The sensor device as illustrated is unique in one feature in that it provides a means whereby bulb 19 is sequentially actuated to more readily indicate to the oprator the low fluid level. This sequential actuation is achieved when the electrical current by-passing resistive material 51 passes through the newly formed circuit for a sufficient period to allow material 57 to cool. This cooling lowers the temperature difference between portions 43 and 45 to thereby reduce the corresponding temperature in that portion of second chamber 49 nearest portion 45, causing the inert gas to contract, drawing contact 51 back to the original position. The current thereafter must pass through resistive material 51 once again due to the disengaged end portions of leads 53 and 55 until this temperature difference is again attained, causing member 51 to once again move. This cycle of temperature changes indirectly raises and lowers the level of current flow in sensor 13 and circuit 11 and therefore causes bulb 19 to be energized intermittently. If desired, however, a steady signal can be provided by use of an electrical or mechanical latching circuit or device which latches on to energize bulb 19 continuously after the first engagement of leads 53 and 55. Such latching circuits or devices can include an SCR, latching relay, or similar circuits and devices. An example of such an arrangement is illustrated in FIG. 5 in which the signal from sensor 13 actuates latching circuit 63, which in turn provides a steady electrical signal to indicating means 19.

An additional important feature of sensor 13 is its ability to operate in fluids having a wide variety of temperatures. When the fluid surrounding tip 33 is excessively warm, the inert gas at both ends of second chamber 49 will expand equally, maintaining contact member 51 in a non-engaging position (as shown in FIG. 3). Should the fluid about tip 33 cool, the gas at both ends will contract at a substantially equal rate, still maintaining contact 51 in a neutral position. It is to be remembered that contact 51 will move to engage the exposed ends of leads 53 and 55 within second chamber 49 only when the temperature difference between spaced apart portions 43 and 45 attains a predetermined level.

In addition to providing means whereby a visual indication is given when the fluid within container 23 is below a certain level, apparatus 10 can be modified to perform other functions by relatively simple alterations to circuit 11, such as energizing other circuits, or to operate other mechanisms such as audible signals, valving arrangements and the like. For example, circuit 11 can be modified to include a means for actuating a valving arrangement in a boiler to thereby either shut down a burner or to open a valve and permit more fluid to enter the container, depending on the pre-established fluid level setting.

Besides this particular application, apparatus 10 may be also used in other situations in which the fluids to be detected vary in temperature throughout their cycles of operation. Primary examples of such situations are found in the several containers of fluids utilized in the operation of automobiles. Sensor device 13 could easily be inserted into an automobile's brake fluid housing, radiator side wall, or the various housings for the transmission fluid, engine oil, power steering fluid, differential fluid, or even the windshield washer fluid, with the automobile's electrical circuitry readily able to substitute for circuit 11.

Thus, there has been provided an apparatus for detecting the presence or absence of fluid at a predetermined level within a container. Unique features of this apparatus, which include temperature compensation means for varying fluid temperatures and sequentially actuated current indicating means, have also been provided.

While there has been shown and described what are at present considered the preferred embodiments of the inventions, it will be obvious to those skilled in the art that various changes and modifications may be made therein without departing from the scope of the invention as defined by the appended claims.

What is claimed is:

1. A sensor device comprising:
   a housing member defining a first chamber;
   a thermally conductive member within said first chamber;
   a tip member secured to said housing and forming a closure for said first chamber;
   an element positioned substantially within said first chamber and having a second chamber enclosed therein, said element having first and second spaced apart portions, said first portion being joined in heat conductive relationship to said thermally conductive member and said second portion being secured in thermally conductive relationship to a surface of the tip member within said first chamber;
   first and second connecting means positioned within said element, said first connecting means joined to said second spaced apart portion of said element, said second connecting means secured to said first spaced apart portion of said element;

means for heating said element including said second chamber and said first and second spaced apart portions;

movable contact means posilioned within said second chamber, said movable contact means adapted for approaching said first spaced apart portion of said element and engaging said first and second connecting means only when the temperature difference between said first and second portions of said element exceeds a predetermined level; and heat responsive means for moving said movable contact means within said second chamber.

2. The sensor device according to claim 1 wherein said heat responsive means for moving said movable contact member comprises a heat responsive fluid medium.

3. The sensor device according to claim 2 wherein said heat responsive fluid medium is an inert gas selected from the group consisting of nitrogen, helium, carbon dioxide, and neon.

4. The sensor device according to claim 1 wherein said element positioned substantially within said first chamber is an electrical resistive element.

5. The sensor device according to claim 1 wherein said thermally conductive member within said first chamber is electrically conductive.

6. The sensor device according to claim 1 wherein said tip member is electrically conductive.

7. The sensor device according to claim 1 wherein said movable contact means positioned substantially within said second chamber is comprised of mercury.

8. A sensing apparatus comprising a sensor device comprising:

a housing member defining a first chamber;

a thermally conductive member within said first chamber;

a tip member secured to said housing and forming a closure for said first chamber;

an element positioned substantially within said first chamber and having a second chamber enclosed therein, said element having first and second spaced apart portions, said first portion being joined in heat conductive relationship to said thermally conductive member and said second portion being secured in thermally conductive relationship to a surface of the tip member within said first chamber;

first and second connecting means positioned within said element, said first connecting means joined to said second spaced apart portion of said element, said second connecting means secured to said first spaced apart portion of said element;

means for heating said element including said second chamber and said first and second paced apart portions;

movable contact means positioned (substantially) within said second chamber, said movable contact means adapted for approaching said first spaced apart portion of said element and engaging said first and second connecting means only when the temperature difference between said first and second portions of said element exceeds a predetermined level;

heat responsive means for moving said movable contact means within said second chamber; and means for sensing when said movable contact means engages said first and second connecting means.

9. The sensing apparatus according to claim 8 wherein said means for sensing when said movable contact means engages said first and second connecting means is an electrical circuit comprising a source of electrical potential operatively connected to said first and second spaced apart portions and a current indicating means adapted for indicating electrical current in said circuit when said movable contact means engages said first and second connecting means.

10. The sensing apparatus according to claim 9 wherein in said sensor device said element within said first chamber is an electrical resistive element and is operatively connected to said source of electrical potential.

11. The sensing apparatus according to claim 10 wherein in said sensor device said thermally conductive member is electrically conductive and is operatively connected to said source of electrical potential and to said electrical resistive element.

12. The sensing apparatus according to claim 11 wherein in said sensor device said tip member is electrically conductive and is operatively connected to said source of electrical potential and said electrical resistive element.

13. The sensing apparatus according to claim 9 wherein in said sensor device said heat responsive means for moving said movable contact means comprises a heat responsive fluid medium.

14. The sensing apparatus according to claim 13 wherein said heat responsive fluid medium is an inert gas selected from the group consisting of nitrogen, helium, carbon dioxide, and neon.

15. The sensing apparatus according to claim 9 wherein said electrical circuit includes a latching means utilized to provide a steady electrical signal from said sensor device to said current indicating means.

* * * * *